United States Patent Office 3,547,993
Patented Dec. 15, 1970

3,547,993
INTERMEDIATES FOR THE PREPARATION OF 1,3-DIHYDRO - 5 - ARYL - 2H - 1,4 - BENZODIAZE-PIN-2-ONE 4-OXIDES
Stanley C. Bell, Penn Valley, Pa., assignor to American Home Products Corporation, New York, N.Y., a corporation of Delaware
No Drawing. Continuation-in-part of application Ser. No. 327,667, Dec. 3, 1963, which is a continuation-in-part of application Ser. No. 283,966, May 29, 1963. This application July 28, 1967, Ser. No. 656,704
Int. Cl. C07c 103/50
U.S. Cl. 260—545     3 Claims

ABSTRACT OF THE DISCLOSURE

2-[2-(N-acetoxyacetamido)acetamido]carboxylic acyl benzenes, valuable intermediates for the preparation of 1,3-dihydro-2H-1,4-benzodiazepin-2-ones having anti-convulsant, sedative and muscle-relaxant activity, are prepared from 2 - (2 - hydroxyaminoacetamido)-carboxylic acyl benzenes by diacylation.

This application is a continuation-in-part of my copending application Ser. No. 327,667 filed Dec. 3, 1963, now abandoned, which in turn was a continuation-in-part of application Ser. No. 283,966 filed May 29, 1963, and now abandoned.

This invention relates to novel compositions of matter classified in the art of chemistry as 2-[2-(N-acetoxyacetamido)-acetamido]carboxylic acyl benzenes, valuable intermediates for the preparation of benzodiazepin-2-ones.

The invention sough to bê patented in its principal composition aspect is described as residing in the concept of a chemical compound having a molecular structure in which there is attached, to the benzene nucleus, a benzoyl radical at one position and, at a position ortho thereto, a 2-(N-acetoxyacetamido)acetamide radical.

The tangible embodiments of the compositions of the invention possess the inherent general physical properties of being relatively high melting, white crystalline solids, are substantially insoluble in water and are soluble in polar solvents, such as lower aliphatic alcohols. Examination of the compounds produced according to the hereinafter described process reveals upon ultraviolet and infrared spectographic analysis, spectral data confirming the molecular structure hereinbefore set forth. Thus, the

linkage and the two

linkages are evident. The aforementioned physical characteristics, taken together with the nature of the starting materials and the mode of synthesis, positively confirm the structure of the compositions sought to be patented.

The tangible embodiments of the compositions of the present invention possess the inherent applied use characteristic of being useful as intermediates for the preparation of known 5-aryl-1,3-dihydro-2H-1,4-benzodiazepin-2-one 4-oxides, as for example in South African Pats. Nos. 60/4,930 to 60/4,936, inclusive, and 60/4,938, and U.S. Pats. Nos. 3,100,770 and 3,117,965, which in turn possess the inherent applied use characteristics of exerting a psycholeptic effect in mammals, as evidenced by evaluation according to standard test procedures. oreover a specific composition of the invention 2[2-(N-acetoxyacetamido) acetamido]-5-chloro-benzophenone exhibited sedative activity when tested according to standard pharmacological test procedures.

The term "nucleus" is used herein as defined and used in "Hackh's Chemical Dictionary," McGraw-Hill Book Company, Inc., 1944, at page 586, and as specifically applied to "benzene nucleus" at pages 107–110. The term "benzene nucleus" as above defined and as used herein and by those skilled in the art means the benzene ring of carbon atoms, wherein all valences are satisfied by hydrogen or other monovalent substituents.

The term "radical" is used herein as defined and used in "Hackh's Chemical Dictionary," McGraw-Hill Book Company, Inc., 1944, at pages 714 and 715. It is a specific group of named atoms in a certain relationship and contains only one free valence bond which must be satisfied, here by attachment to the benzene nucleus.

The manner and process of making and using the compositions and processes of the invention will now be generally described so as to enable a person skilled in the art of chemistry to use the same, as follows:

The processes for making and using the compounds of the invention are illustrated schematically for a specific embodiment thereof, as follows:

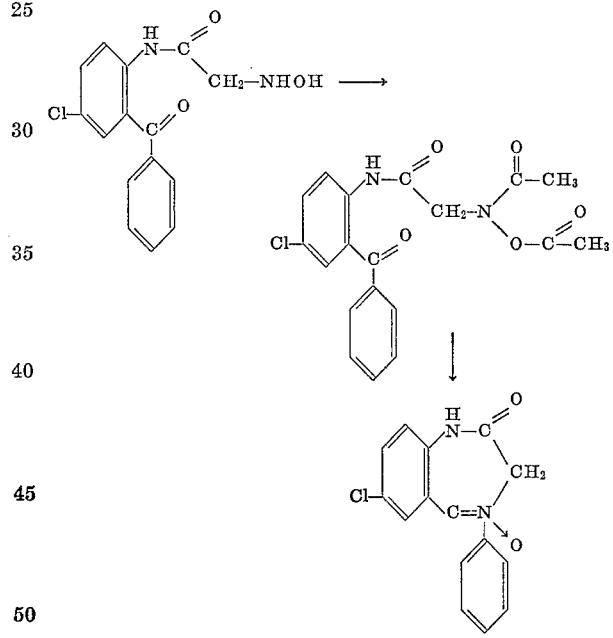

The preparation of the starting materials for the preparation of the compounds of my invention, i.e., the 2-(2-hydroxyaminoacetamido)benzophenones which are prepared by treatment of the appropriate 2-(2-haloacetamido)benzophenones with hydroxyl amine is fully described in co-pending U.S. application Ser. No. 644,900 filed June 9, 1967 and in Ser. No. 283,966 filed May 29, 1963, Ser. No. 283,967 filed May 29, 1963, Ser. No. 301,771 filed Aug. 13, 1963 and Ser. No. 301,873 filed Aug. 13, 1963, all now abandoned.

Acylation of a 2-(2-hydroxyaminoacetamido)benzophenone in the absence of a cyclizing agent, with an excess of acylating agents such as but not limited to acetic anhydride, acetyl chloride, isoprenyl acetate (ketene), ethyl chloroformate, t-butoxy-p-nitrophenyl carbonate, carbotert-butoxyazide and the like produces 2-[2-(N-acyloxy-acylamido)-acetamido]benzophenones. The acylation is brought about in the presence or absence of a solvent with an excess of acylating agent and with gentle warming. If a solvent is used it should be one which will not itself react with the acylating agent. When no solvent is used the course of the reaction may be followed by the disappearance of the p-hydroxyaminoacetamido reactant. Generally the reaction proceeds at a rapid rate but to insure good yields the reaction mixture is allowed to stand for several hours with gentle warming. The temperature at which the reaction occurs should not be so high as to cause decomposition of the desired end product.

Cyclization of the 2[2-(N-acyloxyacylamido)acetamido]benzophenone is preferably carried out in the presence of a non-oxidizing mineral acid such as hydrochloric acid although any strong acid is suitable. The reactants are suspended or dissolved in a non-reactive solvent, for example, ethanol and the mixture brought to boiling for several minutes. On cooling the cyclized product separates out.

The benzene nucleus bearing the 2-(N-acetoxyacetamido)acetamido radical and the carboxylic acyl radical can have one or more mono-valent substituents other than hydrogen, as for example, but without limitation, lower alkyl, alkoxy, alkylthio, nitro, amino, hydroxy, halogen preferably chlorine, bromine, trifluoromethyl or alkylsulfonyl at the 3-, 4-, 5 or 6-positions. Such substituents in the starting materials do not interfere with the course of the reactions here involved for making intermediates useful in preparing active 1,4-benzodiazepines. The carboxylic acyl group can be aroyl, such as benzoyl, 2- or 3-thenoyl; 2- or 3-furoyl; 2-, 3- or 4-pyridyl-carbonyl; or 1- or 2-naphthoyl or it can be alkanoyl. The aryl nucleus of the aryl-keto group can bear one or more simple substituents inert to the reactions herein described, such as lower alkyl, alkoxy, alkylthio, nitro, amino, hydroxy, halogen preferably chlorine, bromine, trifluoromethyl or alkylsulfonyl and such substituted aryl-keto compounds are full equivalents of the unsubstituted aryl nucleus for the purposes of the present invention.

From the disclosure herein illustrating the invention as applied to starting materials which produce compounds wherein the 5-position substituent is phenyl or substituted phenyl, it will be apparent to organic chemists that other mono-cyclic nuclei can be in the starting materials in lieu of phenyl without affecting the course of the reactions involved in the hydroxyamination and the subsequent ring closure. Accordingly, in such intermediates wherein the phenyl group is replaced by 2- or 3-thienyl; 2- or 3-furyl; and 2-, 3- or 4-pyridyl radicals are the full equivalents of the invention as particularly claimed.

When the starting compounds are substituted as hereinbefore recited, it will be apparent herefrom to those skilled in the art of chemistry that the intermediate compounds and the final products formed by the process of invention will bear, correspondingly, the same substituents.

The following examples illustrate the best mode contemplated by the inventor of making and using a specific embodiment of the claimed compositions of the invention.

EXAMPLE 1

Warm a mixture of 5-chloro-2-(2-hydroxyaminoacetamido)benzophenone in acetic anhydride on a steam bath until all the solid dissolves (ca. 10 minutes), and cool. Collect the resultant precipitate to obtain 2[2-(N-acetoxyacetamido)acetamido]-5-chlorobenzophenone, M.P. 151–153° C.

*Analysis.*—Calculated for $C_{19}H_{17}ClN_2O_5$ (percent): C, 58.70; H, 4.41; N, 7.41; Cl, 9.12. Found (percent): C, 58.68; H, 4.42; N, 7.11; Cl, 9.1.

EXAMPLE 2

Suspend 2 - [2 - (N - acetoxyacetamido)acetamido] - 5-chlorobenzophenone in ethyl alcohol containing an excess of hydrochloric acid. Boil the mixture for several minutes until solution occurs and allow to cool. Collect the precipitated 7-chloro-1,3-dihydro-5-phenyl-2H-1,4 - benzodiazepin-2-one 4-oxide, M.P. 238–239° C.

EXAMPLE 3

Following the procedure of Example 1, 2-[2-(N-acetoxyacetamido)acetamido] - 2′,5-dichlorobenzophenone is prepared from 2′,5-dichloro-2-(2-hydroxyaminoacetamido)benzophenone and converted to 7-chloro-1,3-dihydro-5-o-chlorophenyl-2H-1,4-benzodiazepin-2-one 4-oxide by the procedure of Example 2.

The subject matter which the applicant regards as his invention is particularly pointed out and distinctly claimed, as follows:

1. A compound of the structure

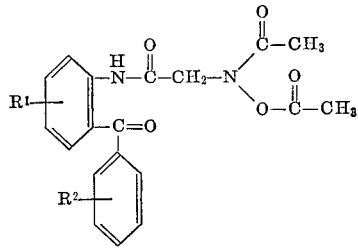

wherein:
$R^1$ is lower alkyl, lower alkoxy, lower alkylthio, nitro, amino, hydroxy, halo, trifluoromethyl or lower alkylsulfonyl; and
$R^2$ is hydrogen, lower alkyl, lower alkoxy, lower alkylthio, nitro, amino, hydroxy, halo, trifluoromethyl or lower alkylsulfonyl.

2. 2 - [2 - (N - acetoxyacetamido)acetamido]-5-chlorobenzophenone.

3. 2 - [2 - (N - acetoxyacetamido)acetamido] - 2′,5 - dichlorobenzophenone.

References Cited

UNITED STATES PATENTS 3,166,587   1/1965   Bernstein et al. _____ 260—545

LORRAINE A. WEINBERGER, Primary Examiner

R. GERSTL, Assistant Examiner

U.S. Cl. X.R.

260—239.3, 295, 332.2, 347.3, 562